US008830143B1

(12) United States Patent
Pitchford et al.

(10) Patent No.: US 8,830,143 B1
(45) Date of Patent: Sep. 9, 2014

(54) ENHANCED VISION SYSTEM AND METHOD FOR AN AIRCRAFT

(75) Inventors: Randall S. Pitchford, Tualatin, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2351 days.

(21) Appl. No.: 11/528,920

(22) Filed: Sep. 28, 2006

(51) Int. Cl.
*G09G 5/00* (2006.01)
*G03H 1/00* (2006.01)
*G02B 27/14* (2006.01)
*G02F 1/1335* (2006.01)

(52) U.S. Cl.
USPC ......... 345/9; 359/13; 359/632; 345/7; 349/11

(58) Field of Classification Search
USPC .......... 345/7–9; 359/13–14, 629–632; 349/11
See application file for complete search history.

(56) References Cited

U.S. PATENT DOCUMENTS 4,842,389 A * 6/1989 Wood et al. ................ 359/3
5,001,558 A * 3/1991 Burley et al. ............... 348/164
6,163,309 A * 12/2000 Weinert ...................... 345/7
7,605,773 B2 10/2009 Janssen
2010/0225566 A1 9/2010 Sato

FOREIGN PATENT DOCUMENTS

JP 09101477 4/1997

OTHER PUBLICATIONS

Office Action for U.S. Appl. No. 13/249,012, mail date Jul. 3, 2013, 13 pages.

* cited by examiner

*Primary Examiner* — Lun-Yi Lao
*Assistant Examiner* — Jarurat Suteerawongsa
(74) *Attorney, Agent, or Firm* — Donna P. Suchy; Daniel M. Barbieri

(57) ABSTRACT

An aircraft optical display system for implementing an enhanced vision system based on light available within the flight deck of an aircraft. The display system includes a visible light imager configured to receive light within a spectral range defined by the photon transmissivity of windshield of the aircraft and generate image data. The system further includes a combiner configured to enable viewing of the world outside of the combiner, and allowing viewing of an enhanced vision image. The system yet further includes an image processing system configured generate an enhanced vision image representative of an external scene to the aircraft based at least in part on the image data from the visible light imager, wherein the enhanced vision image is conformally mapped onto the combiner.

20 Claims, 5 Drawing Sheets

ENHANCED VISION SYSTEM AND METHOD FOR AN AIRCRAFT

BACKGROUND

An enhanced vision system (EVS) for an aircraft is designed to enhance pilot situational awareness during the approach and landing phases of flight at night or during poor weather conditions by providing an infrared (IR) camera view of the outside environment. The imagery may be displayed conformally on a Head-up Guidance System of Head-Up Display, increasing both safety and operational capability of the aircraft.

Enhanced vision systems for aircraft utilize relatively high cost infrared sensors mounted to the external surfaces of the aircraft (fuselage, tail, etc.). The infrared sensors are thermal imagers configured to recognize sources of heat, such as incandescent light sources. Thermal imagers detect thermal radiation rather than photons and, as such, are not configured to differentiate colors associated with the source of the incandescent light. These colors may be critical to a correct interpretation of an aircraft scene (e.g. VASI or PAPI lighting, rabbit-lights, end lights, center lights, edge lights, taxiway lights). Further, thermal imagers are not configured to recognize "cold" sources of light, such as reduced energy consumption light emitting diode (LED) or fluorescent lights sources that are increasingly being used at many airfields.

The performance of infrared enhanced vision systems often lags in poor weather conditions. In particular, infrared sensor performance degrades during certain weather conditions such as high density fog and large rain drops. Performance degradation can be caused by increased infrared scattering, dominant absorption, weak propagation, etc.

Accordingly, there is a need for an improved system and method of providing an enhanced vision system in an aircraft. Further, there is a need for such a system configured to recognize "cold" sources of light. Yet further there is a need to such a system configured to be able to differentiate external light sources based on the color of the light source. Yet further, there is a need for such a system and method coupled to a head up guidance system to provide an enhanced conformal image. Yet further, there is a need for such a system and method configured to modify the conformal image based on a light intensity sensed by the enhanced vision system. Yet further, there is a need to provide useful imagery at a cost level below that of infrared technology.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is an aircraft optical display system for implementing an enhanced vision system based on light available within the flight deck of an aircraft. The display system includes a visible light imager configured to receive light within a spectral range defined by the photon transmissivity of windshield of the aircraft and generate image data. The system further includes a combiner configured to enable viewing of the world outside of the combiner, and allowing viewing of an enhanced vision image. The system yet further includes an image processing system configured generate an enhanced vision image representative of an external scene to the aircraft based at least in part on the image data from the visible light imager, wherein the enhanced vision image is conformally mapped onto the combiner.

What is also provided is a method of generating an enhanced vision image based on light available within the flight deck of an aircraft. The method includes receiving image data representative of light within a spectral range defined by the photon transmissivity of windshield of the aircraft, generating an enhanced vision image representative of an external scene to the aircraft based at least in part on the image data from the visible light imager, and displaying the enhanced vision image on a combiner positioned within the flight deck of the aircraft such that the enhanced vision image is displayed conformally in the line of sight of a pilot on the aircraft.

Further, what is provided is an aircraft optical display system for implementing an enhanced vision system based on light available within the flight deck of an aircraft. The display system includes a visible light imaging means configured to receive light within a spectral range defined by the photon transmissivity of windshield of the aircraft and generate image data and a combiner means. The combiner enabling viewing of the world outside of the combiner, and allowing viewing of an enhanced vision image. The system further includes an image processing means configured generate an enhanced vision image representative of an external scene to the aircraft based at least in part on the image data from the visible light imager, wherein the enhanced vision image is conformally mapped onto the combiner.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1A:
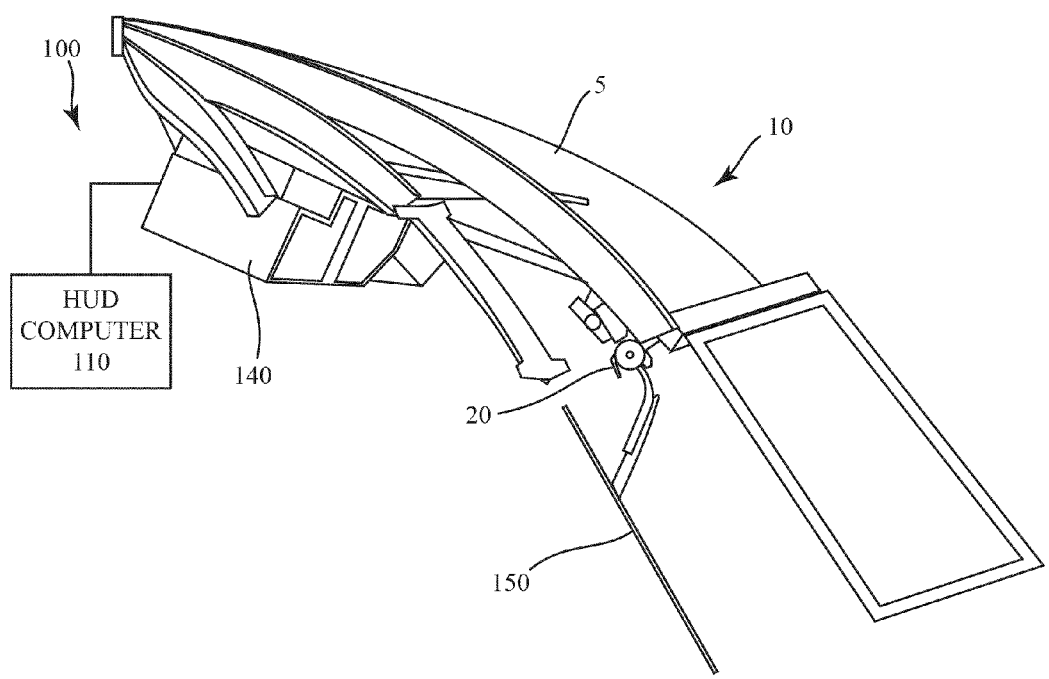
FIG. 1A is an enhanced vision system including a photon-sensitive imager and a head up display system of the projection type in the flight deck of an aircraft, according to an exemplary embodiment.

Before describing in detail the particular improved system and method, it should be observed that the invention includes, but is not limited to, a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In an exemplary embodiment, a computer system is used which has at least one processing unit that executes sequences of instructions contained in a memory, and may include highly parallel subsidiary processors, as may be implemented on field programmable gate array (FPGA) devices. More specifically, execution of the sequences of instructions causes the processing unit to perform functional operations, which are described below. The instructions may be loaded into a random access memory (RAM) for execution by the processing unit from a read-only memory (ROM), a mass storage device, or some other persistent storage. In other embodiments, hardwired circuitry may be used in place of, or in combination with, software instructions to implement the exemplary embodiments. Thus, the embodiments described herein are not limited to any specific combination of hardware circuitry and software, nor to any particular source for the instructions executed by the computer system.

Referring first to FIG. 1A, an enhanced vision system 10 including a visible light imager 20, a head up display system 100 including a HUD computer 110 and an overhead projection unit 140, and an image combiner 150 in a flight deck of an aircraft 5 is shown, according to an exemplary embodiment. Although vision system 10 is shown with particular components arranged in a particular configuration, system 100 may alternatively include more, fewer, and/or a different configuration of components to perform the functions described herein.

According to an exemplary embodiment, visible light imager 20 may be a complimentary metal oxide semiconductor (CMOS) active pixel sensor having a high dynamic range. Accordingly, visible light imager 20 may be configured to sense light within a large wavelength range from visible light to near-infrared. Visible light imager 20 may be particularly configured to sense available light that may is transmitted through the windshield of the aircraft. Accordingly, imager 20 may be configured to receive light within the forward looking spectral range which is constrained to the transmissivity of the windshield (approximately the UV region to about 2 microns in wavelength).

Visible light imager 20 may be coupled to and configured to provide image data to head up display system 100. For example, shown in FIG. 1, visible light imager 20 may be coupled to combiner 150. According to an exemplary embodiment, visible light imager 20 may be mounted to combiner 150 such that the line of sight for imager 20 is roughly equivalent to the line of sight of a pilot of the aircraft 5.

Figure 1B:
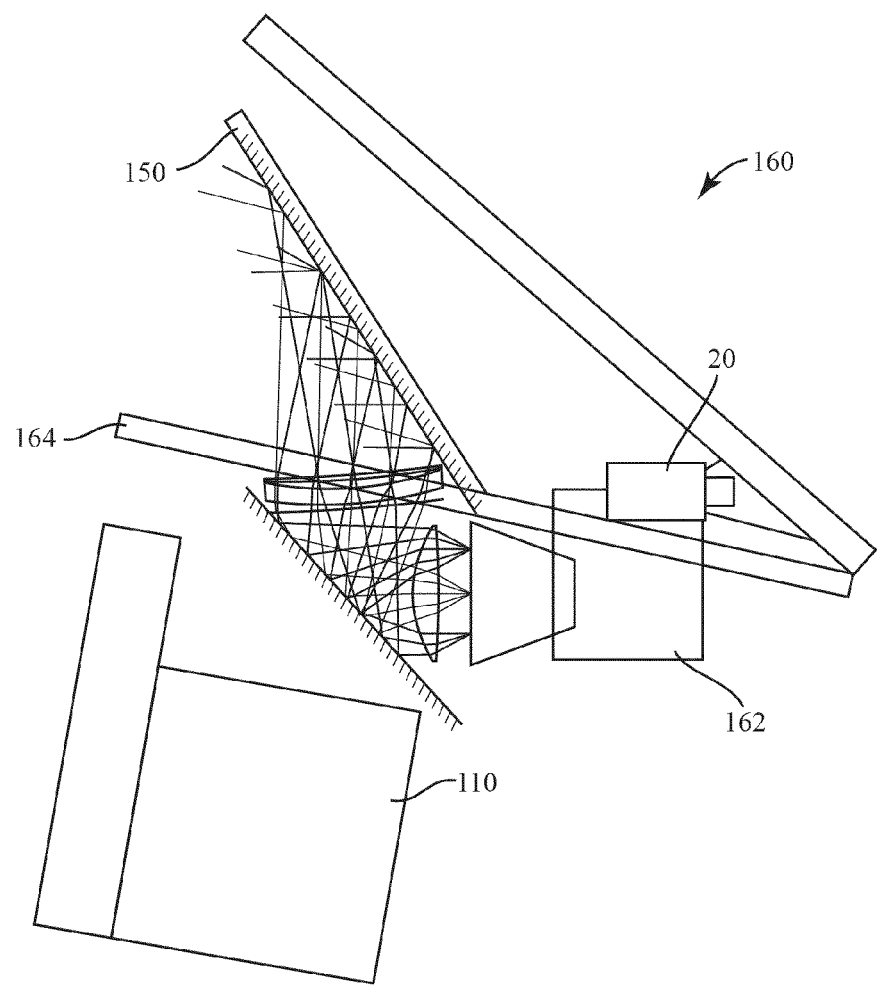
FIG. 1B is a view of an enhanced vision and head up display system of the glareshield type including a closely coupled but not co-packaged photon-sensitive imager, according to an exemplary embodiment.

Referring now to FIG. 1B, the enhanced visions system of FIG. 1A may alternatively be implemented within a glareshield type heads up display 160. Glareshield display 160 may be configured to include the imager 20, HUD computer 110, combiner 150, glareshield HUD electronics 162, and glareshield 164. Operation of glareshield heads up display 160 may be otherwise similar to the operation of heads up display system 10. Similar to FIG. 1A, imager 20 may be position to achieve the effect of rough equivalency with the pilots line of sight.

Figure 1C:
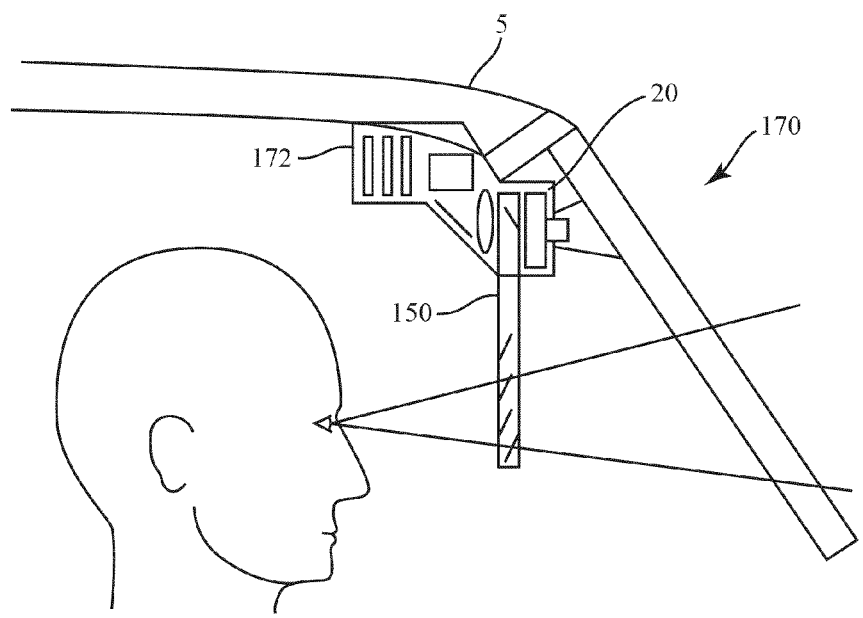
FIG. 1C is an enhanced vision system including a co-packaged photon-sensitive imager in a head up display system of the planar type in the flight deck of an aircraft, according to an exemplary embodiment.

Referring now to FIG. 1C, the enhanced visions system of FIG. 1A may alternatively be implemented within a planar type heads up display 170. Planar type display 170 may be configured to include the imager 20, a substrate HUD computer 172, and a combiner 150. Operation of planar type heads up display 160 may be otherwise similar to the operation of heads up display system 10. Similar to FIGS. 1A and 1B, imager 20 may be position to achieve the effect of rough equivalency with the pilots line of sight.

Referring again to FIG. 1A, enhanced vision system 10 may be coupled to and configured to operate in conjunction with an infrared sensor in addition to visible light imager 20. The infrared sensor may be coupled to the outside body of the aircraft 5. Image data received by the infrared sensor may be processed in conjunction with the image data from imager 20 to further enhance the image data displayed to the pilot of the aircraft. Advantageously, where imager 20 is used in conjunction with the infrared sensor, a lower resolution uncooled microbolometer may be used to detect structural background features. The infrared sensor image data may be used algorithmically to establish edges and features in the image data of imager 20 where more intense or detailed processing of the visible light image is desirable to create an enhanced vision image.

Combiner 150 is a plate of partially-reflective (coated) glass, consequently, it will allow some external light to pass through it and will also reflect part of the light projected onto it by the lens system. In this manner, both images, external and projected, can be viewed simultaneously. Accordingly, the image generated using imager 20 may be superimposed over the pilots view of the external aircraft view.

Figure 2A:
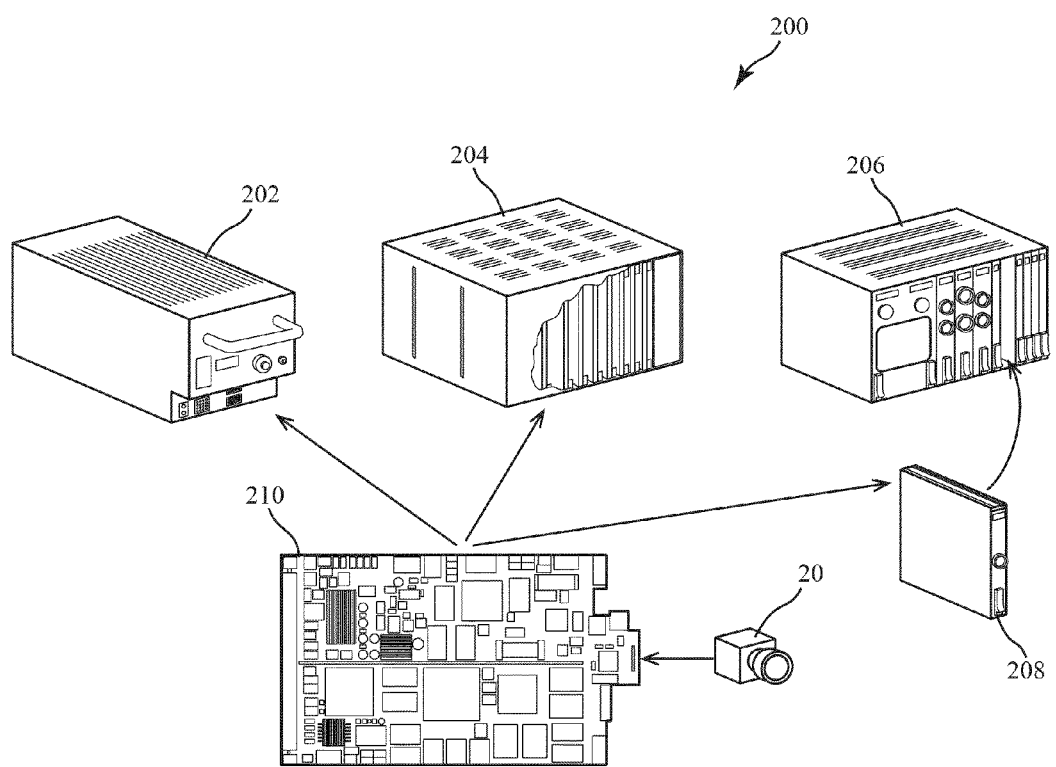
FIG. 2A is a module diagram of the associated computational capability for a head-up display (HUD) system, according to an exemplary embodiment.

Referring now to FIG. 2A, a module diagram of the alternative computational capabilities for a head-up display (HUD) system 200 is shown, according to an exemplary embodiment. HUD system 200 includes a HUD computer, such as HUD computer 110 described above with reference to FIGS. 1A-1C and a head up display mechanism of an appropriate type to the particular flight deck application, such as the types shown and described above with reference to FIGS. 1A-C. Implementation of HUD computer 110 may alternatively and/or inclusively include an avionics-bay Stand-Alone HUD Computer 202, a HUD Computer in an Integrated Avionics Cabinet 204, or a HUD Computer in a Modular Avionics Cabinet 206 including an individual module housing 208. HUD computer 202-206 include an image processor 210 couple to an imager 20 configured to perform the functions described herein.

HUD computer 110 may be a stand alone avionics-compatible computer, a board level component of a avionics rack system, a board level component of a head-down instrument suite, or any other type of computing system configured to perform the functions described herein. HUD computer 100 may be implemented using a single computing system or a combination of computing systems.

HUD computer 110 may include redundancy features to eliminate undetected sensor based error for regulated low visibility applications. Imager 20 may be coupled to the HUD computer using avionic busses intended for transmission of image data such as ARINC 817, using commercial camera interface busses such as Camera Link, made by the Automated Imaging Association of Ann Arbor, Mich., etc. For example, imager 20 may be coupled to an appropriate input port 112 to transfer image data to HUD computer 100.

A board-level image processor may be configured to transfer data in accordance with the overall aircraft avionics system architecture and packaging. According to an exemplary embodiment, the interface from the imager 20 to the image processor 210 may be configured in accordance with ARINC 717. Further, the bus-level HUD computer interface may be the Master Bus of the Head Up Guidance system.

An imaging system monitor 212 may be implemented upon the image processor 210 to detect faults and anomalies within the imager itself. According to an exemplary embodiment, the system monitor may be implemented on a processor embedded with the packaging of a field programmable gate array, or may be in an independent package. Whenever imaging system monitor 212 detects a sensor comparison failure, a warning message is conveyed to be displayed on image processor 210 for response.

Figure 2B:
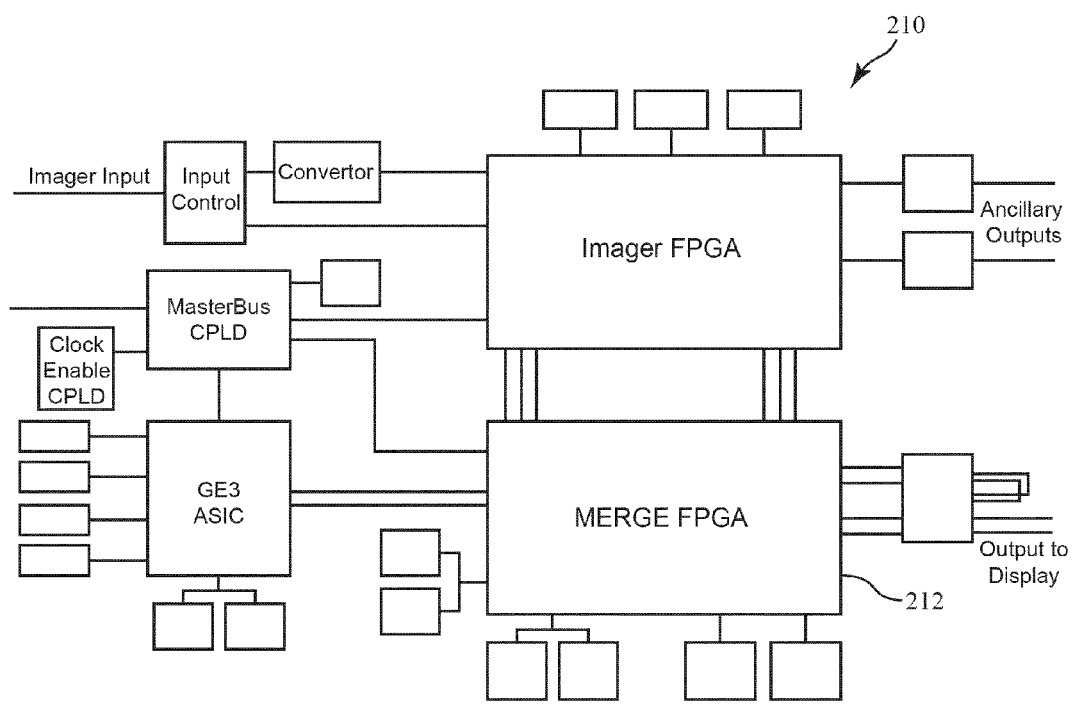
FIG. 2B is a block diagram of an image processing system, according to an exemplary embodiment.

Referring now to FIG. 2B, the image processing system 210 of display system 200 is shown in further detail, according to an exemplary embodiment. Image processor 210 is a processor configured to implement image enhancement algorithms, de-weathering algorithms, and/or other image processing tasks requiring a high degree of parallelism.

Image processor 210 is configured to received image data from imager 20 and process the image data for display to the pilot of aircraft 5 via the HUD computer. Processing the image data may include de-weathering the image, conforming the image based on sensor information, displaying the image on combiner 150, etc., described in further detail below.

Although HUD computer 110 and image processor 210 is shown in FIG. 2B with a specific configuration of components and couplings, it is understood that HUD computer 110 may include more, fewer, or different components in a variety of arrangements that are configured to perform the functions described herein. For example, according to an alternative embodiment, HUD computer 110 and image processor may further include a low voltage power supply that is configured to provide power to the imager. Further, the components may be independent components configured to interact to perform the functions described herein as well as additional functions. Yet further, function described as being performed by separate components may be performed by a single component.

Even though the visible light imager is installed as part of a HUD installation, image data received from the visible light imager 20 may be processed in such a way as to be displayed on a head-down display, or routed to other image busses within the aircraft for display to other crew stations or via the passenger entertainment displays.

Image processor 210, configured a part of a HUD system is further configured to receive image data from visible light imager 20. The received image data may be image data within the visible light to near-infrared spectrum transmitted through the windshield of the aircraft. The image data may further be roughly representative of the image seen from the aircraft flight deck through the line of sight of the pilot of the aircraft.

The image processor 210 may be configured to generate an enhanced external scene image based at least in part on the image data received from visible light imager 20. The enhanced external scene image may be generated also based on additional sensor or database information such as thermal infrared information, radar information, airport topology information, etc. An enhanced external scene image may include a representation of the external view to the aircraft featuring one or more enhancements.

A first exemplary enhancement may include a symbolic representation of the color of one or more external light sources on a HUD or actual color on a head-down display. Exemplary external light sources may include airport lighting, runway lighting, etc. The color may be displayed on combiner 150 such that the position of the color on combiner 150 is in line with the location of the light source in the line of view of the pilot of the aircraft through combiner 150. Accordingly, color of the light source viewable by the pilot of the aircraft is augmented by color displayed on combiner 150.

A second exemplary enhancement may include the use of geometric data derived from the image sources by image processing algorithms such as edge detection algorithms for the purpose of locating key airfield edges, such as runway edges, and/or for correlating the location of the edges to the computational location of the edges for a secondary source such as a SVS database.

A third exemplary enhancement may include displaying a representation of the external scene on a display where the representation is unaffected by weather conditions external to the aircraft. For example, a representation of the pilot view may be shown where the visible light image has been processed to remove the effects of fog, rain, snow, etc.

An enhanced image may be displayed to a pilot of aircraft 5. Displaying the enhanced image may include displaying the image on combiner 150, displaying the image on a head-down flight deck, routing the image to other on-board display devices or systems, etc. The displayed image may be displayed in color or monochrome. Advantageously, because image sensor 20 can sense light from sources that are beyond the wavelength seen through human vision, the enhanced image may include features that cannot be discerned by the naked human eye.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. An aircraft optical display system for implementing an enhanced vision system based on light available within a flight deck of an aircraft, the display system comprising:
a visible light imager configured to receive light within a spectral range defined by the photon transmissivity of windshield of the aircraft and generate image data;
a combiner, the combiner enabling viewing of the world outside of the combiner, and allowing viewing of an enhanced vision image; and
an image processing system configured to generate the enhanced vision image representative of an external scene to the aircraft based at least in part on the image data from the visible light imager, wherein the enhanced vision image is conformally mapped onto the combiner.

2. The aircraft optical display system of claim 1, wherein the visible light imager is positioned such that imager axes are proximal to the normal visual axis of a pilot of the aircraft.

3. The aircraft optical display system of claim 1, wherein the enhanced vision image is generated based on information received from an infrared sensor positioned external to the flight deck.

4. The aircraft optical display system of claim 1, wherein the enhanced vision image includes a representation of color of an external light source.

5. The aircraft optical display system of claim 1, wherein the enhanced vision image is configured to include an enhanced representation of an airfield surface.

6. The aircraft optical display system of claim 1, wherein intensity of the enhanced vision image is configured based on ambient light data received from the visible light imager.

7. The aircraft optical display system of claim 1, wherein contrast of the enhanced vision image is configured based on ambient light data received from the visible light imager.

8. The aircraft optical display system of claim 1, wherein the image processing system is configured to generate the enhanced vision image by removing weather effects from the image data received from the visible light imager.

9. A method of generating an enhanced vision image based on light available within a flight deck environment of an aircraft, the method comprising:
   receiving image data from a visible light imager, the visible light imager being representative of light within a spectral range defined by the photon transmissivity of windshield of the aircraft;
   generating an enhanced vision image representative of an external scene to the aircraft based at least in part on the image data from the visible light imager; and
   displaying the enhanced vision image on a combiner positioned within the flight deck environment of the aircraft such that the enhanced vision image is displayed conformally in the line of sight of a pilot on the aircraft.

10. The method of claim 9, wherein the enhanced vision image is generated based on information received from one additional sensor such as an infrared sensor positioned external to the flight deck.

11. The method of claim 9, wherein the enhanced vision image includes a symbolic or actual representation of color of an external light source.

12. The method of claim 9, wherein the the enhanced vision image is generated by removing weather effects from the image data received from the visible light imager.

13. An aircraft optical display system for implementing an enhanced vision system based on light available within a flight deck of an aircraft, the display system comprising:
   a visible light imaging means configured to receive light within a spectral range defined by the photon transmissivity of windshield of the aircraft and generate image data;
   a combiner, the combiner enabling viewing of the world outside of the aircraft, and allowing viewing of an enhanced vision image; and
   an image processing means configured to generate the enhanced vision image representative of an external scene to the aircraft based at least in part on the image data from the visible light imaging means, wherein the enhanced vision image is conformally mapped onto the combiner.

14. The aircraft optical display system of claim 13, wherein the visible light imaging means is positioned such that imager axes are proximal to the normal visual axis of a pilot of the aircraft.

15. The aircraft optical display system of claim 13, wherein the enhanced vision image is generated based on information received from an infrared sensing means positioned external to the flight deck.

16. The aircraft optical display system of claim 13, wherein the enhanced vision image includes a representation of color of an external light source.

17. The aircraft optical display system of claim 13, wherein the enhanced vision image is configured to include an enhanced representation of an airfield surface.

18. The aircraft optical display system of claim 13, wherein intensity of the enhanced vision image is configured based on ambient light data received from the visible light imaging means.

19. The aircraft optical display system of claim 13, wherein contrast of the enhanced vision image is configured based on ambient light data received from the visible light imaging means.

20. The aircraft optical display system of claim 13, wherein the image processing system is configured to generate the enhanced vision image by removing weather effects from the image data received from the visible light imaging means.

* * * * *